March 29, 1955     G. L. MEYERS ET AL     2,705,041
APPARATUS FOR MANUFACTURE OF REINFORCED FLEXIBLE TUBING
Filed Nov. 19, 1949     4 Sheets-Sheet 1
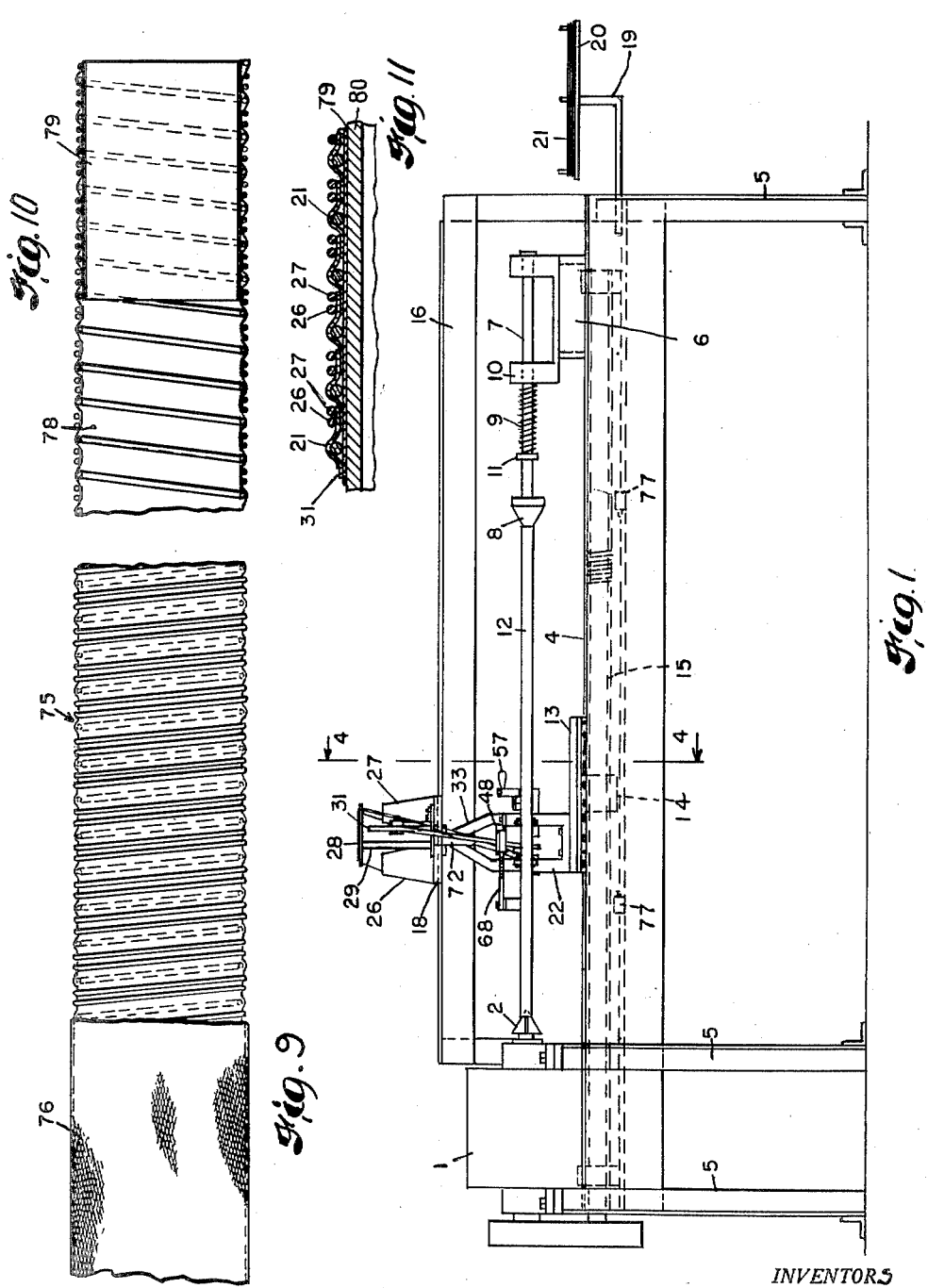
INVENTORS
GEORGE L. MEYERS,
JOHN C. SHUTT,
BY JOHN E. SCHRINER
Oberlin & Limbach
ATTORNEYS

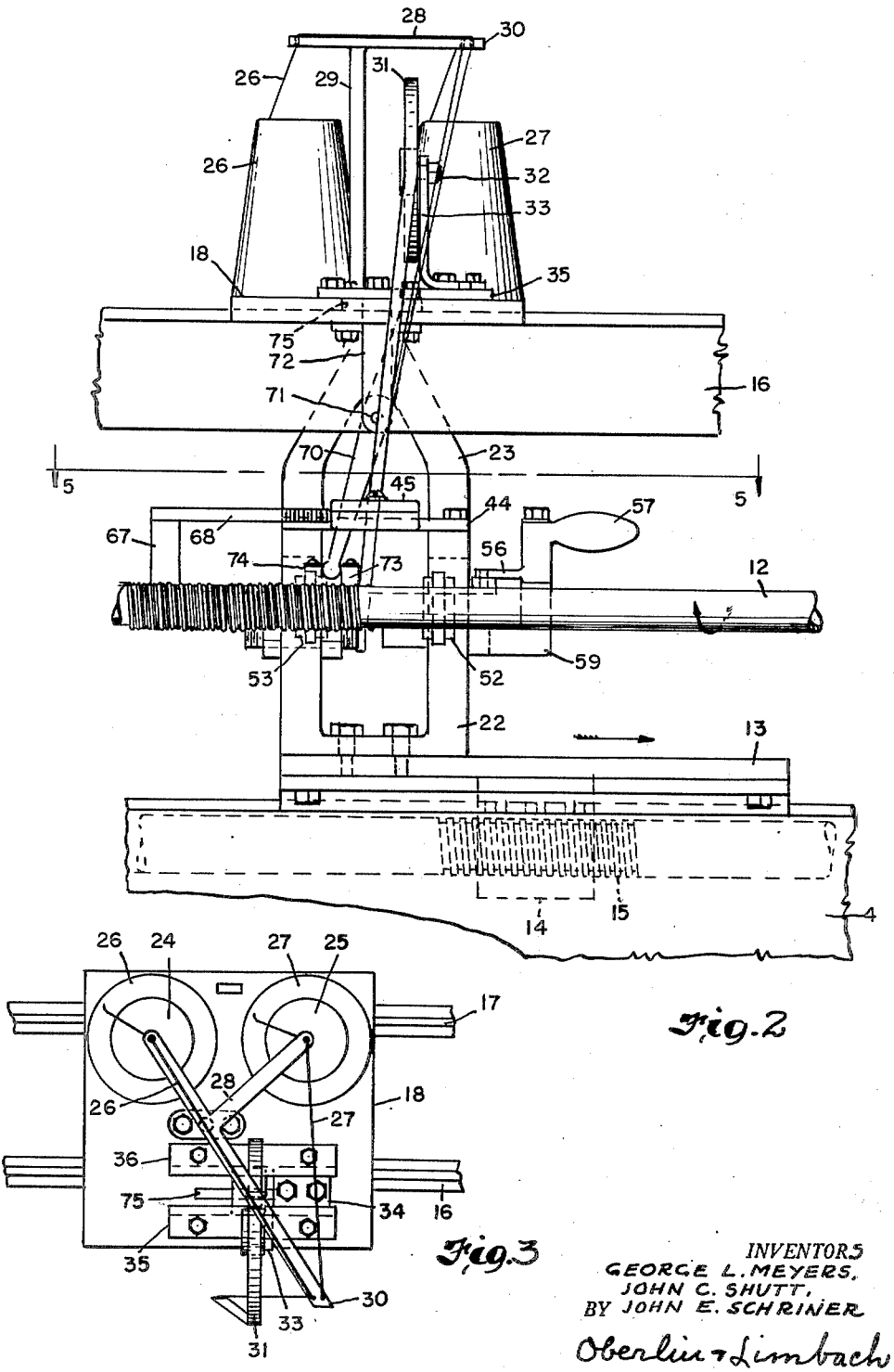

March 29, 1955  G. L. MEYERS ET AL  2,705,041
APPARATUS FOR MANUFACTURE OF REINFORCED FLEXIBLE TUBING
Filed Nov. 19, 1949  4 Sheets-Sheet 3
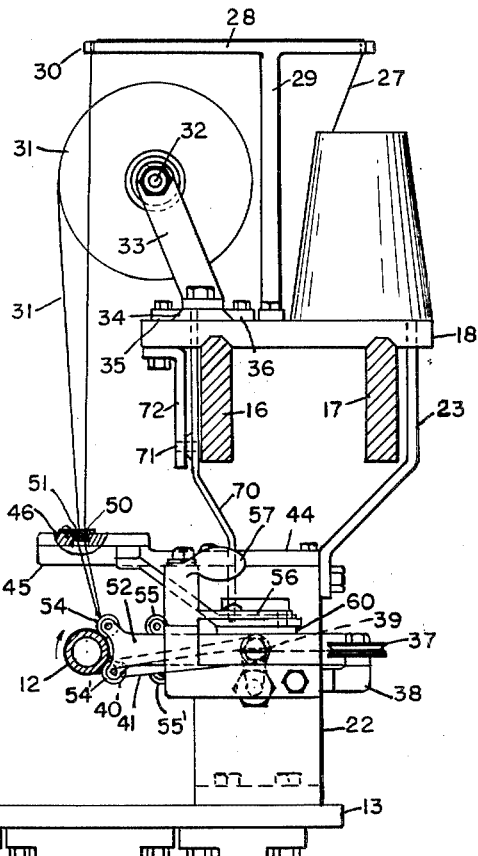
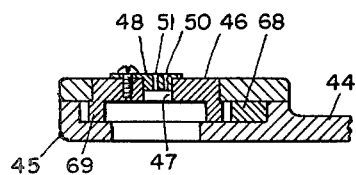
Fig. 7
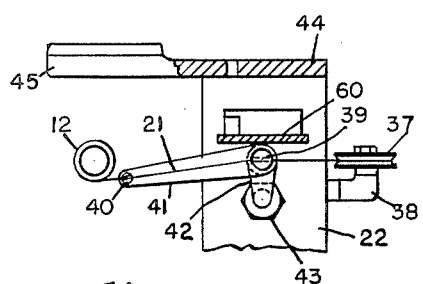
Fig. 8
Fig. 4
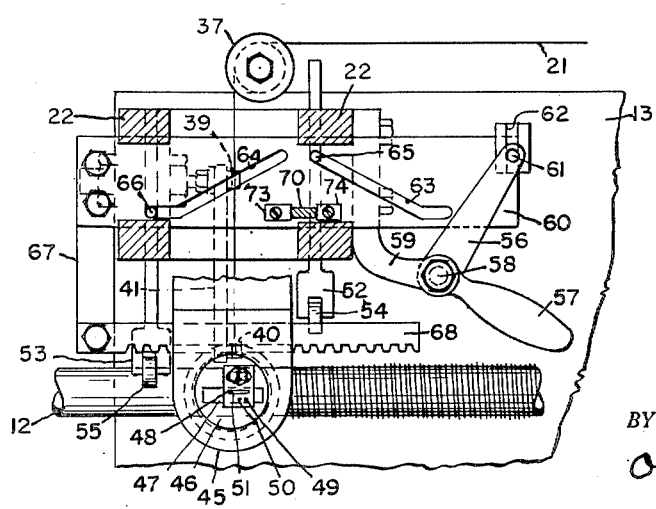
Fig. 6
INVENTORS
GEORGE L. MEYERS,
JOHN C. SHUTT,
BY JOHN E. SCHRINER
Oberlin & Limbach
ATTORNEYS.

March 29, 1955 G. L. MEYERS ET AL 2,705,041
APPARATUS FOR MANUFACTURE OF REINFORCED FLEXIBLE TUBING
Filed Nov. 19, 1949 4 Sheets-Sheet 4

INVENTORS
GEORGE L. MEYERS,
JOHN C. SHUTT,
BY JOHN E. SCHRINER

Oberlin + Limbach
ATTORNEYS.

United States Patent Office 2,705,041
Patented Mar. 29, 1955

2,705,041

APPARATUS FOR MANUFACTURE OF REINFORCED FLEXIBLE TUBING

George L. Meyers, Willoughby, John C. Shutt, Wickliffe, and John E. Schriner, Willoughby, Ohio, assignors, by mesne assignments, to The Eagle-Picher Company, Cincinnati, Ohio, a corporation of Ohio Application November 19, 1949, Serial No. 128,306

20 Claims. (Cl. 154—5)

This invention relates to flexible hose and, more particularly, to hose of the type commonly employed for vacuum cleaners and the like.

Very large quantities of hose or flexible tubing are produced for use with such devices as vacuum cleaners, defrosters for automobiles, air conditioning equipment, etc., and such tubing commonly comprises a helically wound wire reinforcing member and fabric wall material wrapped about the same. In the case of vacuum cleaner hose the tubing thus produced may then be enclosed within an outer braided tube to provide increased resistance to wear as well as an improved ornamental appearance.

Tubing of this type is ordinarily manufactured by first winding the reinforcing wire about a mandrel on a lathe and then folding a long strip of fabric about such wire-wrapped mandrel with the opposed edges of the fabric strip overlapping to form a longitudinal seam parallel to the axis of the mandrel. When employing the usual woven fabric, it has been found highly desirable that the same be cut on a bias in order that the finished product may have the desired flexibility required in use. It has consequently been standard practice to cut strips of cloth on a bias and to then tack the same together to form a long continuous strip which is wound on a reel for use as needed. Such fabric is commonly coated or impregnated with a rubber or equivalent composition which, when cured, is adapted to form a long-lived impervious wall for the tubing. After folding the strip about the mandrel as above described, a cord may then be wound about the wire and fabric wrapped mandrel with the turns of such cord lying between the turns of the wire in order to draw the fabric in toward the mandrel between the turns of wire and thereby produce a somewhat corrugated effect which will assist in retaining the wire helix in place in the finished product and also somewhat enhance the flexibility of the tubing. The mandrel with the above-described elements thereon is now placed in a curing oven and, after curing, the cord may be unwound if desired and the finished tubing is stripped from the mandrel.

There are a number of disadvantages in the above-described method which, however, is the one now usually employed.

The operation of cutting the fabric into strips on a bias is an expensive and wasteful one, as is also the operation of then piecing such strips together. When applied to the mandrel, a series of bumps or ridges will appear at those points along the mandrel where the ends of the bias strip sections have been thus spliced together. The main seam or overlap which will run longitudinally along one side of the finished article also naturally interferes with flexing of the hose on the side toward such seam. During manufacture of the tubing care must be taken to see that the fabric overlaps uniformly throughout the length of the mandrel, and there is continual danger that such overlap will not be sufficient in local regions. In fact, small pieces of tape are often employed to hold the overlapping fabric together at specified intervals along the mandrel until the outer cord wrapping can be applied. It is therefore a primary object of our invention to provide a method of manufacturing flexible tubing or hose of a type particularly adapted for use with vacuum cleaners and the like which will secure the advantages obtained by the use of bias cut fabric while employing strips of ordinary fabric material not cut on a bias.

Another object of our invention is to provide a flexible hose or tubing of the general type indicated above which will be uniform in appearance and equally flexible in all directions.

Still another object is to provide hose or tubing of the type in question which will have less tendency to kink in use than that now produced.

A further object is to provide such flexible tubing specially adapted to have a braided cover applied thereto having a smooth and uniform appearance.

A still further object is to provide novel apparatus for the production of such tubing which will be very rapid and substantially automatic in operation.

It is also an object to provide such apparatus having traveling winding mechanism adapted to be reversed for winding in either of two directions.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevational view of one embodiment of our novel apparatus including a lathe having novel winding mechanism mounted thereon;

Fig. 2 is a view of such winding mechanism similar to that of Fig. 1 but on an enlarged scale;

Fig. 3 is a top plan view of the mechanism of Fig. 2;

Fig. 4 is a vertical elevational view of such winding mechanism taken along the line 4—4 on Fig. 1;

Fig. 6 is a view similar to Fig. 5 but showing a portion of the mechanism broken away to illustrate the manner of reversing the same;

Fig. 7 is an enlarged detail view in cross-section of the tape and string guide means;

Fig. 8 is a fragmentary detail view of the wire guide means;

Fig. 9 shows the finished tubing adapted to be produced on our new apparatus;

Fig. 10 is a sectional view of an end portion of such tubing; and

Fig. 11 is an enlarged detail view in section showing the arrangement of the several component parts of such tubing.

General construction of the apparatus

Figure 5:
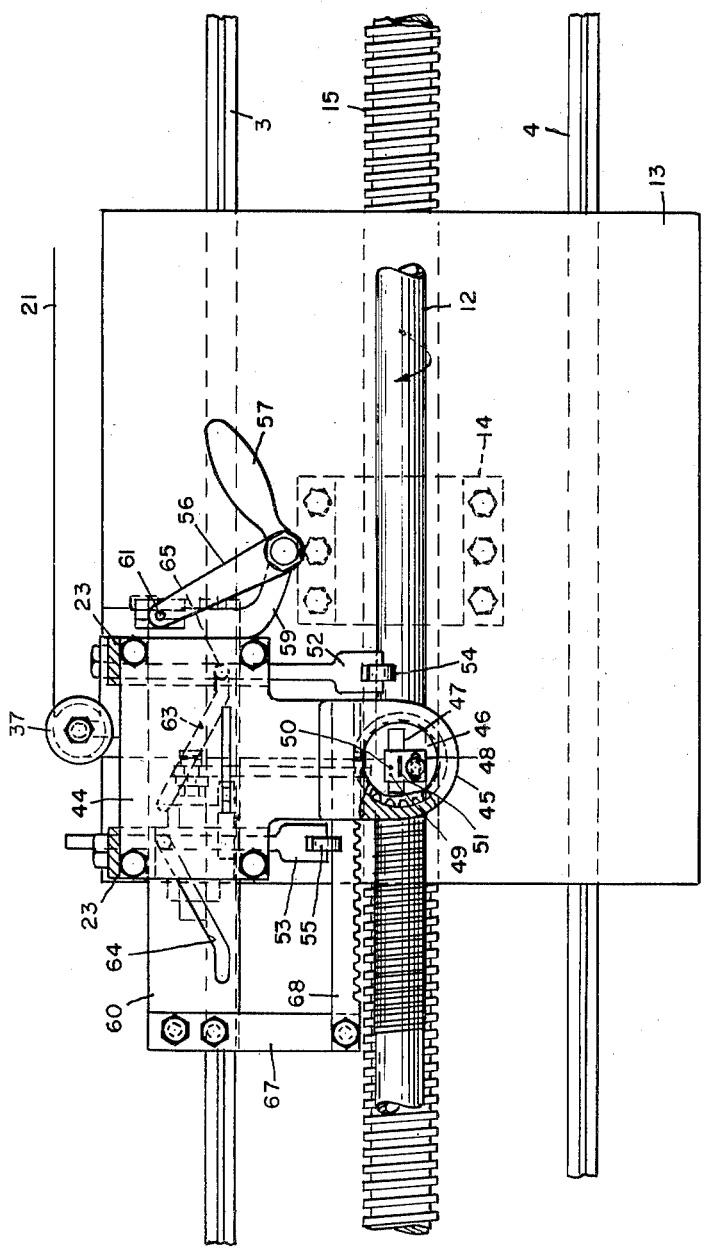
Fig. 5 is a top plan view of the lower portion of such mechanism taken along the line 5—5 on Fig. 2.

Referring now more particularly to said drawing and especially Fig. 1 thereof, the preferred embodiment of our novel apparatus there illustrated comprises a lathe of the usual type including a gear box 1, a driven chuck 2 and a bed comprising ways 3 and 4, all supported by standards 5. The usual electric motor (not shown) will be provided to drive such gears and any desired form of change speed mechanism may be employed. Mounted on ways 3 and 4 and adapted to be adjustably positioned therealong is a stand 6 having a tail stock spindle 7 journalled therein carrying a revolving center 8 at its end. Compression spring 9 is inserted between bracket 10 of such stand and a collar 11 on such tail stock to facilitate the insertion and removal of a tubular mandrel 12 between such conical live center 2 and revolving center 8.

The usual saddle 13 is provided adapted to travel along ways 3 and 4 with a traveling nut 14 bolted to the underside of the saddle and threadedly engaging lead screw 15 of the lathe. The winding mechanism of our invention is carried by this saddle in a manner explained more in detail below.

Upper extensions of lathe standards or supports 5 also support two additional ways 16 and 17 generally above way 3 of the main lathe bed (see Fig. 4). An upper saddle 18 is mounted upon such upper ways for travel therealong in association with main or lower saddle 13.

Supported by a bracket 19 on the far end of the lathe from gear box 1 is a rotatably mounted reel 20 adapted to turn in a horizontal plane and carrying a supply of wire 21 wound thereon.

It will be seen from the foregoing that except for certain of the specific details described the lathe which is adapted to constitute the foundation of our novel apparatus may be of general conventional construction, so that lathes now generally employed may readily be modified for use in accordance with our invention.

*The winding mechanism*

As previously indicated, we provide novel winding mechanism adapted to be reciprocated along ways 3 and 4 and ways 16 and 17 by means of lead screw 15.

Such latter mechanism comprises a supporting stand 22 bolted to saddle 13 and having an upwardly extending arm 23 rigidly connected to upper saddle 18 so that such upper saddle will travel along ways 16 and 17 as lower saddle 13 travels along ways 3 and 4.

Two vertically mounted spools or spindles 24 and 25 are carried by such upper saddle 18 (Fig. 3—the exact number of such spools or spindles being a matter of choice as will appear below) upon which supplies of cotton cord 26 and 27 will have been wound. A guide member 28 of general Y-shape is supported by an upright 29 on saddle 18, the long arm 30 of such Y extending at an angle and terminating substantially directly above mandrel 12 and lead screw 15. The two short arms of such guide member which terminate above the respective spools 24 and 25 are pierced with holes through which the cords 26 and 27 are respectively conducted to a pair of holes in the overhanging end of arm 30.

A roll of tape 31 is rotatably mounted about a horizontal axis 32 supported by bracket 33. Such bracket in turn is mounted on a slide 34 movable in a direction parallel to ways 16 and 17 between gibs 35 and 36 for a purpose to be explained below.

The wire 21 coming from supply reel 20 is conducted around horizontal guide pulley 37 carried by bracket 38 on stand 22. The wire then passes through a perforated stud 39 and a perforated stud 40 at the end of arm 41. Such arm is pivotally mounted on stand 22 for rotation about the axis of stud 39 and is provided with a depending arm 42 adapted to be locked in selected position by means of bolt 43. Such bolt passes through a short slot in stand 22 permitting a small amount of play whereby arms 42 and 41 may be rocked to position terminal stud 40 properly for delivery of wire 21 to the rotating mandrel 12.

As best shown in Figs. 4 and 5, a top plate 44 is supported by the upper ends of the uprights comprising standard 22 and includes a projecting portion 45 which extends outwardly over mandrel 12. A guide disc 46 is mounted in such projecting member for rotation in a horizontal plane and has a slot 47 therein. A guide shoe 48 is adapted to be adjustably positioned along such slot and is itself provided with perforations 49 and 50 through which cords 26 and 27 are adapted to be conducted and a slot 51 through which tape 31 passes. Such tape and cord are then wound on mandrel 12 with the latter overlying the former as shown in Fig. 4 and Fig. 11.

Presser shoes 52 and 53 carrying pairs of rollers 54, 54′ and 55, 55′ respectively are adapted to bear against the mandrel to steady the latter. Shoes 52 and 53 are mounted in standard 22 for reciprocation toward and away from mandrel 12 and means is provided whereby when one of said shoes is extended the other will automatically be retracted.

As previously indicated, it is one of the objects of our invention to provide winding mechanism adapted to wind lengths of continuous material on a mandrel, which mechanism may readily be reversed so that it will now become operative to wind in the opposite direction, thereby achieving a notable increase in efficiency over prior art mechanisms where it has been necessary to return to original starting position before the operation might be repeated. Figs. 2, 3, 4 and 5 show the winding mechanism adjusted for travel from left to right along the lathe bed as viewed in such figures and the mandrel 12 will be rotating in a clockwise direction as shown in Fig. 4. Mandrel supporting shoe 52 will be advanced and shoe 53 will be retracted. Slide 34 carrying the roll of tape 31 will be in right-hand position as shown in Fig. 3. Disc 46 will be in the position shown in Fig. 5 with slot 51 through which the tape 31 passes being outside of perforations 49 and 50 through which pass the cords 26 and 27.

When the winding mechanism is to travel in the opposite direction along the bed of the lathe to form the hose on mandrel 12 starting from the right-hand end of the latter, the mechanism will be adjusted as shown in Fig. 6 with shoe 52 retracted and shoe 53 extended. Disc 46 will have been rotated 180° so that perforations 49 and 50 are now outside of slot 51 and slide 34 will have been shifted to the left to similarly shift the position of the roll of tape 31. The means for accomplishing such adjustment will now be explained in detail.

A lever arm 56 is adapted to be rocked by handle 57 about a vertical pivot 58 at the end of bracket 59 secured to standard 22. Such rocking of lever 56 serves to reciprocate slide 60 mounted in standard 22 for movement in a horizontal plane, the end of arm 56 being provided with a pin 61 fitting in lost motion slot 62 on such slide 60. Cam slots 63 and 64 are engaged by upstanding cam follower pins 65 and 66 on shoes 52 and 53 respectively (see Figs. 5 and 6). Consequently, when slide 60 is reciprocated as above described, one of such shoes will be advanced and the other shoe retracted.

The other end of slide 60 from arm 56 is provided with a bracket 67 carrying a rack 68 which passes through outrigger support 45 (see Figs. 5, 6 and 7). The teeth of such rack engage teeth on a pinion 69 on the under side of disc 46 whereby reciprocation of slide 60 and therefore rack 68 will serve to rotate such disc through 180°.

A lever 70 is pivotally mounted at 71 adjacent its mid-point on a bracket 72 depending from the under side of upper saddle 18 (Figs. 2 and 4). The lower end of such lever is engaged between two upstanding lugs 73 and 74 mounted on the upper surface of slide 60 whereby such lever is adapted to be rocked by the aforesaid reciprocation of such slide. The upper end of the lever 70 extends through a slot 75 in saddle 18 and engages loosely in a socket in the under side of slide 34. Consequently, when slide 60 is reciprocated, lever 70 will be effective to shift slide 34 and therefore the supply spool of tape 31 in the opposite direction.

*Operation*

With saddle 13 and the winding mechanism carried thereby positioned at the left-hand end of the lathe as viewed in Fig. 1, the wire 21 is passed around guide pulley 37 and conducted through perforated studs 39 and 40. The end of such wire is then secured to mandrel 12, ordinarily by inserting the same in a small hole or slot in such mandrel.

Handle 57 is turned as shown in Fig. 5 so that slide 34 and roll of tape 31 will be in right-hand position as viewed in Fig. 3. The tape is drawn downwardly from the supply roll through slot 51 in guide disc 46, such disc of course being in the position shown in Fig. 5. The mandrel 12 may then be rotated a turn or two and the end of tape 31, which is ordinarily of fabric impregnated with an adhesive rubber composition, adhered thereto. The cords 26 and 27 are now drawn down through the holes in the end of guide arm 30 and holes 50 and 49 in disc 46 and attached to the outside of tape 31 on the mandrel by means of a small bit of adhesive tape or the like.

Upon now operating the lathe mandrel 12 will be rotated in a clockwise direction as viewed in Fig. 4 (see also Figs. 2 and 5) to wind the wire, tape and cord thereon while saddle 13 and the winding mechanism carried thereby are caused to traverse from left to right along ways 3, 4 and 16, 17 through the action of lead screw 15. The desired pitch of the several elements wound upon the mandrel is, of course, determined by the relative speed of rotation of such mandrel and the speed of traverse of the winding mechanism. As shown in Figs. 9, 10 and 11, it is preferred that these elements be wound upon the mandrel with the succeeding turns of tape overlapping each other intermediate the turns of wire with such wire covered by but a single layer of tape. The cords are wound in the region of such tape overlap to substantially fill the valley between the turns of wire. Accordingly, when a braided covering 76 is subsequently applied to the hose, such covering is uniformly supported thereon and presents a smooth wrinkle-free exterior surface.

When handle 57 is moved to the Fig. 5 position as above described, it retracts shoe 53 and advances shoe 52 so that rollers 54, 54' are brought into engagement with mandrel 12 to brace and steady the latter adjacent to and in advance of the point of winding.

When saddle 13 and the winding mechanism have completed their traverse from left to right, limit switch 77 will be engaged by traveling nut 14 stopping the lathe. The operator then cuts the cords 26 and 27 adjacent the mandrel and cuts the tape just below guide disc 46. The loose end of tape remaining attached to the newly wound hose is then manually wrapped around the mandrel to secure the string and wire. The operator next severs the wire adjacent the mandrel and removes the mandrel from the lathe. Such mandrel with the hose thereon will ordinarily be taken to a curing oven where the rubber composition tape is cured and the finished hose thereafter stripped from the mandrel. By thus curing on the mandrel any substantial shrinkage in diameter is avoided, but there will be some slight shrinkage longitudinally. The braided covering 76 may now be applied in conventional manner.

As soon as the tubular mandrel 12 is removed from the lathe, it is replaced by another mandrel to which the end of wire 21 is similarly secured. Handle 57 is now moved to the Fig. 6 position shifting slide 60 as there illustrated. Tape 31 is drawn down through slot 51 and attached to the near side of the mandrel as viewed in Figs. 1 and 2, for example. As shown in Fig. 6, guide disc 46 will have been rotated 180° by the reciprocation of slide 60 so that holes 49 and 50 through which cords 26 and 27 pass are now outside slot 51. The ends of such cords are accordingly likewise secured to the mandrel on the near side (outside) of such tape.

The turning of handle 57 into Fig. 6 position has likewise operated to retract shoe 52 and to advance shoe 53 so that rollers 55, 55' now bear against and support the mandrel to the left of the winding station.

Such turning of handle 57 has also operated to rock lever 70 to shift slide 34 carrying the roll of tape 31 to the left so that such tape will approach the mandrel at the proper angle conforming to the winding pitch. Since guide arm 41 for wire 21 is fixed slightly to the left of tape guide slot 51, the wire will be wound upon the mandrel a fraction of a turn in advance of the application of such tape thereto.

Lathe gear box 1 includes the usual reversing mechanism (not shown) whereby such lathe may now be caused to operate in the reverse direction, causing mandrel 12 to rotate in a counterclockwise direction and saddle 13 carrying the winding mechanism to traverse from right to left as viewed in Fig. 1. The lathe is stopped when left-hand limit switch 77' is engaged. It will be apparent that the operation of our new apparatus may be substantially automatic, the operator interceding only when the lathe stops at the conclusion of each traverse to sever the tape, cords and wire and remove and replace the mandrel. Since the various components of our new tubing are wound upon the mandrel simultaneously and at the same traveling station, the manufacture of such tubing is greatly expedited in contrast to prior art methods where a series of operations were required to be performed in sequence.

The tubing

As above indicated, it is one object of our invention to provide a novel form of flexible hose or tubing which will be uniformly flexible in all directions and which is adapted to have a braided cover applied thereto which will present a pleasing and wear-resistant outer surface without any of the usual bulges or wrinkles therein. It is obvious that a variety of types of tape may be employed in accordance with our invention and such tape may be impregnated with neoprene (polychloroprene) or other plastic compositions instead of rubber. In fact, for some purposes such tape may be entirely of rubber, for example, without the employment of the usual woven fabric material. Likewise, the wire employed may be the usual copper coated steel wire generally employed in the manufacture of flexible tubing but may instead be any other form of suitable elongated reinforcing element such as other types of wire and even certain of the more resilient synthetic plastics. The cord employed will be chosen to properly fill the valleys or corrugations formed in the outer surface of the tubing between the turns of the reinforcing element and the number of turns of cord thus employed will ordinarily be determined by the width of such valleys. Thus, instead of the two spools of cord shown carried by upper saddle 18, a lesser or greater number may be provided as required.

Referring now more particularly to Figs. 9, 10 and 11, Fig. 9 shows the finished tubing partly enclosed in its braided casing 76. Prior to forming such tubing upon the mandrel, a short length of fabric 79 may be wrapped around end portions of the latter to be enclosed within the ends of the tubing 78 then wound thereon. As best shown in Fig. 11, which is an enlarged fragmentary view in cross-section of an end portion of such tubing, the individual turns of the tape 31 overlie the turns of wire 21 in but a single thickness and overlap in the valleys between such turns of wire. The turns of cords 26 and 27 will be seen to substantially fill such valleys between the turns of wire and therefore provide a sufficiently uniform outer surface to the tubing for application of the braided covering 76 thereon. The flexibility of the finished tubing is considerably enhanced by thus causing adjacent turns of the tape 31 to overlap each other only at points intermediate the turns of wire and preferably the overlapping portions of such tape will be somewhat spaced from the turns of wire as shown to obtain maximum flexibility. The insert 79 facilitates the fitting of the end of the flexible tubing over a pipe, nozzle, or fitting 80 when so desired.

The helical winding of the fabric tape will be seen to give a desirable bias lie to the threads thereof, further improving the strength and flexibility of the finished article. As the cords are wound upon the tape they assist in causing the latter to conform to the mandrel and in obtaining a good adhesive bond between the overlapping adjacent turns and between the tape and the wire. The final product is remarkably uniform in appearance and characteristics and does not evidence the tendency to kink which is so objectionable in certain types of prior art hose or tubing. And coupled with the advantages of its construction is its low cost of manufacture resulting from our improved method and use of our novel apparatus.

The cord which is wound upon the fabric strip or tape layer intermediate the turns of the reinforcing element need not necessarily be drawn from a supply transported by the saddle or carriage of the apparatus but may be conducted to such carriage from a fixed reel similarly to such wire. It has been found more convenient to mount the spools or cones of cord upon the carriage to avoid obstructing access to the apparatus and it is particularly desirable thus to mount the spool of strip material or tape to facilitate shifting the feed of the latter to the mandrel as described.

The use of the cord winding fills the valleys between the turns of the reinforcing element, thereby forming a relatively uniform outer surface of the tubing suitable for the braiding of a wear-resistant and ornamental covering in situ thereon. Instead of a braided covering, other covering materials may be employed such as certain synthetic plastic materials extruded or sprayed on such surface. The cord winding permits retention of a desired degree of flexibility in such tubing and is therefore ordinarily preferred, but other elongated elements, such as fabric or rubber tape, may instead be employed to fill the valleys between the turns of wire.

While rubber or plastic-impregnated woven fabric tape is a very satisfactory tube wall material various other strip materials may be utilized as above explained, and a suitable bonding agent or cement may be applied at the winding station to secure the overlapping turns together. The tightly wound outer cord wrapping not only fills the valleys between the wire turns but, being applied substantially simultaneously with the winding of the tape on the mandrel, tightly presses the overlapping portions of such tape together to ensure that a good bond is obtained.

It is further apparent that our new machine may be employed in the production of tubing for other uses than vacuum cleaner hose and the like and accordingly the cord or equivalent wrapping and outer braided covering may sometimes be omitted. The upper ways and upper saddle desirably employed in such apparatus are not absolutely essential, although providing improved rigidity, and a single carriage travelling closely adjacent and parallel to the mandrel may be employed. The mandrel may also be reciprocated longitudinally and a stationary support employed rather than a saddle or carriage but such a reversal of functions would necessitate the use of considerably more floor space.

The guide disc or equivalent guide means need not necessarily lie in a horizontal plane but should be arranged to pivot in a plane parallel to the mandrel so that the positions of tape and cord may be reversed for winding in the opposite direction without tangling the same.

Other modes of applying the principle of the invention may be employed, change being made as regards the details described, provided the features stated in any of the following claims or the equivalent of such be employed.

We therefore particularly point out and distinctly claim as our invention:

1. In apparatus for the manufacture of flexible tubing having a helical reinforcing member and flexible wall material supported thereby, such apparatus including a lathe, a tubular mandrel adapted to be rotated thereby and removable therefrom, and a lower saddle adapted to be reciprocated longitudinally of such mandrel; the combination of ways supporting such saddle, supplemental ways above said first ways, an upper saddle connected to said lower saddle for travel along said supplemental ways in synchronism therewith, a supply of cord carried by said upper saddle, a slide on said upper saddle parallel to said ways, a supply of tape mounted on said slide, a reel of reinforcing wire mounted on one end of the bed of such lathe, guide means on said lower saddle adapted to conduct such wire to a point adjacent such mandrel, a bracket carried by said lower saddle and extending above such mandrel and said wire guide means, a guide disc mounted in said bracket for pivotal movement in a horizontal plane, a slot in said disc normally parallel to and directly above such mandrel, a guide shoe on said disc adapted to be adjustably fixed along said slot, a smaller slot in said shoe through which such tape is adapted to pass prior to winding on such mandrel, perforations in said shoe laterally adjacent such latter slot through which such cord is adapted to pass prior to winding about such mandrel upon such tape, a pair of presser shoes supported by said lower saddle for reciprocation toward and away from such mandrel to either side of said bracket respectively, rollers on said shoes adapted to engage such mandrel when advanced to steady the same, a slide carried by said lower saddle for reciprocation parallel to such mandrel, a hand lever for reciprocating said latter slide, cam means on said latter slide adapted alternately to retract one said presser shoe and advance the other when reciprocated by said hand lever, rack and gear means operated by said latter slide adapted to rotate said guide disc 180° when said slide is thus reciprocated, and a lever mounted for rocking movement about a horizontal axis, one end engaging said slide on said lower saddle and the other end engaging said tape carrying slide on said upper saddle, whereby upon reciprocation of said lower slide in one direction said upper slide and tape supply will be shifted in the opposite direction.

2. In apparatus for the manufacture of flexible tubing having a helical reinforcing member and flexible wall material supported thereby, such apparatus including a lathe, a tubular mandrel adapted to be rotated thereby and removable therefrom, longitudinally disposed ways parallel to such mandrel, a lower saddle adapted to travel along such ways, and a lead screw driven by such lathe operative to reciprocate such saddle on such ways; the combination of supplemental ways parallel to and above said first-named ways, an upper saddle on said supplemental upper ways connected to such lower saddle for reciprocation therewith, a supply of cord carried by said upper saddle, a slide on said upper saddle parallel to said ways, a roll of tape mounted on said slide about an axis parallel to such mandrel, a reel of reinforcing wire mounted on the bed of such lathe adjacent an end thereof, guide means carried by such lower saddle adapted to conduct such wire to a point adjacent such mandrel for winding thereon, said guide means including an arm mounted for pivotal adjustment in a vertical plane and extending generally toward such mandrel with a wire guiding ferrule at its end, a bracket carried by such lower saddle and extending outwardly above such mandrel and said wire guide means, a guide disc mounted in said bracket for pivotal movement in a horizontal plane, a slot in said disc normally parallel to and directly above such mandrel, a guide shoe on said disc adapted to extend over said slot and to be adjustably positioned therealong, a smaller slot in said shoe parallel to said first slot through which such tape is adapted to pass prior to winding on such mandrel, a perforation in said shoe laterally adjacent said smaller slot through which such cord is adapted to pass prior to winding about such mandrel upon such tape, a pair of presser shoes carried by such lower saddle for reciprocation toward and away from such mandrel to either side of said bracket respectively, rollers carried by said shoes on axes parallel to such mandrel adapted to engage such mandrel when advanced to steady the same, a slide mounted on such lower saddle for reciprocation parallel to such mandrel, a hand lever for reciprocating said latter slide, cam means on said latter slide, follower means on said presser shoes engaging said cam means adapted alternately to retract and advance said respective presser shoes when said slide is thus reciprocated by said lever, a rack carried by said latter slide, gear teeth on said guide disc in engagement with said rack adapted to rotate said guide disc 180° when said slide is thus reciprocated, and a lever mounted for rocking movement about a horizontal axis, one end engaging said slide on such lower saddle and the other end engaging said tape carrying slide on said upper saddle, whereby upon reciprocation of said lower slide in one direction said upper slide and tape supply will be shifted in the opposite direction.

3. In apparatus for the manufacture of flexible tubing having a helical reinforcing member and flexible wall material supported thereby, such apparatus including a lathe, an elongated mandrel adapted to be rotated thereby and removable therefrom, longitudinally disposed ways parallel to such mandrel, a lower saddle adapted to travel along such ways, and a lead screw driven by such lathe operative to reciprocate such saddle on such ways; the combination of supplemental ways parallel to and above such first-named ways, an upper saddle on said supplemental upper ways connected to said such lower saddle for reciprocation therewith, a supply of cord carried by said upper saddle, a roll of tape adjustably mounted on said upper saddle for positioning the same in alternative locations longitudinally therealong, guide means on such lower saddle adapted to conduct a reinforcing wire from a supply thereof to a point adjacent such mandrel for winding on the latter, a bracket carried by such lower saddle and extending outwardly above such mandrel and the point of winding of such wire, a guide disc mounted in said brackets for pivotal movement in a horizontal plane, said disc having an opening therethrough, a guide shoe on said disc extending across such opening and adapted to be adjustably positioned relative thereto longitudinally of such mandrel, said shoe having a slot normally parallel to such mandrel through which such tape is adapted to pass prior to winding on such mandrel, said shoe also having a perforation laterally adjacent such slot through which such cord is adapted to pass prior to winding about such mandrel upon such tape, a pair of anti-friction presser shoes carried by such lower saddle for reciprocation toward and away from such mandrel respectively to either side of the region of winding such materials on such mandrel, the presser shoe thus advanced being adapted to engage and steady such mandrel closely in advance of such winding, means operative simultaneously thus to advance one said presser shoe while retracting the other, means operative in synchronism with said presser shoe operating means adapted simultaneously to rotate said guide disc 180°, and further means operative in synchronism with said presser shoe operating means and guide disc rotating means to shift said roll of tape in a direction parallel to such mandrel.

4. In apparatus for the manufacture of flexible tubing having a helical reinforcing member and flexible wall material supported thereby, such apparatus including a lathe, an elongated mandrel adapted to be rotated thereby and removable therefrom, longitudinally disposed ways parallel to such mandrel, a saddle adapted to travel along such ways, and a lead screw driven by such lathe operative to reciprocate such saddle on such ways; the combination of a supply of cord carried by such saddle, a supply of tape adjustably mounted on such saddle for positioning the same in alternative locations longitudinally therealong, guide means on such saddle adapted to conduct a continuous reinforcing element from a supply thereof to a point adjacent such mandrel for winding on the latter, a guide member carried by such saddle for pivotal movement in a horizontal plane generally above the point of winding of such reinforcing element about such mandrel, said guide member having a guide slot therein normally parallel to such mandrel through which such tape is adapted to pass prior to winding on such mandrel, said guide member also having a perforation therethrough laterally adjacent such slot through which such cord is adapted to pass prior to winding about such mandrel upon such tape, a pair of anti-friction presser shoes carried by such saddle for reciprocation toward and away from such mandrel respectively to either side of the region of winding such materials on such mandrel, the presser shoes thus advanced being adapted to engage and steady such mandrel closely in advance of such winding, means operative to advance one said presser shoe while retracting the other, means operative to rotate said pivotal guide member 180°, and means operative to shift said supply of tape in a direction parallel to such mandrel.

5. In apparatus for the manufacture of flexible tubing having a helical reinforcing member and flexible wall material supported thereby, such apparatus including a lathe, an elongated mandrel adapted to be rotated thereby and removable therefrom, longitudinally disposed ways parallel to such mandrel, a saddle adapted to travel along such ways, and a lead screw driven by such lathe operative to reciprocate such saddle on such ways; the combination of tape supply means longitudinally shiftable along such saddle, guide means on such saddle adapted to conduct a continuous reinforcing element from a supply thereof to a point adjacent such mandrel for winding on the latter, a guide member carried by such saddle for pivotal movement in a horizontal plane generally above the point of winding of such reinforcing element about such mandrel, said guide member having a guide slot therein normally parallel to such mandrel through which such tape is adapted to pass prior to winding on such mandrel, said guide member also having a perforation therethrough laterally adjacent such slot through which a cord is adapted to be led from a supply thereof prior to winding about such mandrel, a pair of anti-friction presser shoes carried by such saddle for reciprocation toward and away from such mandrel respectively to either side of the region of winding such material on such mandrel, the presser shoe thus advanced being adapted to engage and steady such mandrel closely in advance of such winding, means operative to rotate said guide member 180°, and means operable to shift said tape supply means in a direction parallel to such mandrel to a position in advance of the region of winding such materials on such mandrel.

6. In apparatus for the manufacture of tubing having a helical reinforcing member and flexible wall material supported thereby, such apparatus including a removable rotatable elongated mandrel, drive means operative to rotate such mandrel selectively in either direction, a carriage mounted for reciprocation adjacent and parallel to such mandrel, and drive means operative thus to reciprocate such carriage; the combination of tape supply means shiftable longitudinally along such carriage, guide means on such carriage adapted to conduct a continuous reinforcing element from a supply thereof to a point adjacent such mandrel for winding on the latter, a guide member mounted on such carriage for pivotal movement in a horizontal plane generally above the point of winding of such reinforcing element about such mandrel, said guide member having a guide slot therein normally parallel to such mandrel through which such tape is adapted to pass prior to winding on such mandrel, said guide member also having a small hole therethrough laterally adjacent such slot through which a cord is adapted to be conducted from a supply thereof prior to winding about such mandrel upon such tape, means mounted on such carriage adapted to engage and steady such mandrel in advance of the winding operation, means operative to rotate said guide member 180°, and means operable to shift said tape supply means in a direction parallel to such mandrel to a position in advance of the point of winding the same on such mandrel.

7. In apparatus for the manufacture of tubing having a helical reinforcing member and flexible wall material supported thereby, such apparatus including a removable rotatable elongated mandrel, drive means operative to rotate such mandrel selectively in either direction, a carriage mounted for reciprocation adjacent and parallel to such mandrel, and drive means operative thus to reciprocate such carriage; the combination of guide means on such carriage adapted to conduct a continuous reinforcing element from a supply thereof to a point adjacent such mandrel for winding on the latter, a guide member mounted on such carriage for 180° pivotal movement in a horizontal plane generally above the point of winding of such reinforcing element, said guide member having a guide slot therein normally parallel to such mandrel through which a continuous length of tape is adapted to be conducted prior to winding on such mandrel, said guide member also having an opening therethrough laterally adjacent such slot through which a cord is adapted to be conducted from a supply thereof prior to winding upon such tape about such mandrel, means on such carriage adapted to engage and steady such mandrel in advance of the region of winding, and means adapted to supply such length of tape to such slot from a position in advance of the latter.

8. In apparatus for the manufacture of tubing having a helical reinforcing member and flexible wall material supported thereby, such apparatus including a removable rotatable elongated mandrel, drive means operative to rotate such mandrel selectively in either direction, a carriage mounted for reciprocation adjacent and parallel to such mandrel, and drive means operative thus to reciprocate such carriage; the combination of guide means on such carriage adapted to conduct a continuous reinforcing element from a supply thereof to a point adjacent such mandrel for winding on the latter, a guide member mounted on such carriage for 180° pivotal movement in a horizontal plane generally above the point of winding of such reinforcing element, said guide member having a guide slot therein normally parallel to such mandrel through which a continuous length of tape is adapted to be conducted prior to winding on such mandrel, said guide member also having an opening therethrough laterally adjacent such slot through which a cord is adapted to be conducted from a supply thereof prior to winding upon such tape about such mandrel, and means on such carriage adapted to engage and steady such mandrel in advance of the region of winding.

9. In apparatus for the manufacture of tubing having a helical reinforcing member and flexible wall material supported thereby, such apparatus including a removable rotatable elongated mandrel, drive means operative to rotate such mandrel selectively in either direction, a carriage mounted for reciprocation adjacent and parallel to such mandrel, and drive means operative thus to reciprocate such carriage; the combination of guide means on such carriage adapted to conduct a continuous reinforcing element from a supply thereof to a point adjacent such mandrel for winding on the latter, and a guide member mounted on such carriage for 180° pivotal movement in a horizontal plane generally above the point of winding of such reinforcing element, said guide member having a guide slot therein normally parallel to such mandrel through which a continuous length of tape is adapted to be conducted prior to winding on such mandrel, and said guide member also having an opening therethrough laterally adjacent such slot through which a cord is adapted to be conducted from a supply thereof for winding upon such tape about such mandrel.

10. In apparatus for the manufacture of tubing of the type in which one element is helically wound upon another helically wound element, an elongated rotatable mandrel, a carriage mounted for reciprocation adjacent and parallel to said mandrel, and a guide member mounted on said carriage and extending over said mandrel, said guide member being rotatable 180° in a plane parallel to such mandrel and having two openings therethrough through which such respective elements are adapted to be conducted prior to winding on said mandrel, such openings lying on a line normally transverse of said mandrel.

11. In apparatus for the manufacture of tubing of the type in which one element is helically wound upon another helically wound element, an elongated rotatable mandrel, a support relatively reciprocable longitudinally of said mandrel, and a guide member carried by said support mounted for pivotal movement in a plane generally parallel to such mandrel, said guide member having two openings therethrough through which such respective tubing elements are adapted to be conducted, prior to winding on said mandrel, whereby by pivoting said guide member such elements will be relatively disposed for winding one on the other on said mandrel in accordance with the direction of rotation of said mandrel.

12. In apparatus for helically winding two continuous elements upon an elongated mandrel one element upon the other, a support relatively reciprocable longitudinally of such mandrel, and guide means pivotally mounted on said support, said guide means having separate offset spaced guides for such respective elements whereby by pivoting said guide means such elements will be disposed for winding the same element upon the other such element whichever direction such mandrel is rotated.

13. In apparatus for the manufacture of tubing having a helical reinforcing member and flexible wall material supported thereby, such apparatus including a removable rotatable elongated mandrel, drive means operative to rotate such mandrel selectively in either direction, a carriage mounted for reciprocation adjacent and parallel to such mandrel, and drive means operative thus to reciprocate such carriage; the combination of guide means on such carriage adapted to conduct continuous lengths of such reinforcing element and wall material respectively to such mandrel for winding thereon in desired relationship, a pair of presser shoes mounted on such carriage for reciprocation toward and away from such mandrel to either side of the region of such winding respectively, rollers carried by said shoes on axes parallel to such mandrel adapted to engage such mandrel, and means operative to advance one presser shoe in advance of the region of winding to steady such mandrel while retracting the following presser shoe, having regard to the direction of travel of such carriage.

14. In apparatus for the manufacture of tubing having a helical reinforcing member and flexible wall material supported thereby, such apparatus including a removable rotatable elongated mandrel, drive means operative to rotate such mandrel selectively in either direction, a carriage mounted for reciprocation adjacent and parallel to such mandrel, and drive means operative thus to reciprocate such carriage; the combination of guide means on such carriage adapted to deliver continuous lengths of such reinforcing member and wall material respectively to such mandrel for winding thereon in desired relationship, and a pair of anti-friction presser shoes mounted on such carriage for reciprocation toward and away from such mandrel respectively to either side of the region of such winding, the presser shoe thus advanced being adapted to engage and steady such mandrel closely in advance of such winding and the following shoe being retracted, having regard to the direction of travel of such carriage.

15. In apparatus for the manufacture of tubing including a helically found element, such apparatus comprising an elongated rotatable mandrel and a carriage mounted for reciprocation adjacent and parallel to such mandrel; the combination of means on such carriage adapted to deliver a continuous length of such element to such mandrel for winding thereon, and means on such carriage adapted to engage and steady such mandrel in advance of the region of winding longitudinally of such mandrel.

16. In apparatus for the manufacture of tubing having a helical reinforcing member and flexible wall material supported thereby, such apparatus including a removable rotatable elongated mandrel, drive means operative to rotate such mandrel selectively in either direction, a carriage mounted for reciprocation adjacent and parallel to such mandrel, and drive means operative thus to reciprocate such carriage; the combination of guide means on such carriage adapted to conduct a continuous reinforcing element from a supply thereof to a point adjacent such mandrel for winding on the latter, and a roll of strip wall material rotatably mounted on such carriage on an axis generally parallel to such mandrel for shifting longitudinally of such carriage between positions respectively to either side of said guide means, whereby said roll may be positioned in advance of the point of winding of such reinforcing element on such mandrel, having regard to the direction of reciprocation of such carriage, to permit such strip material to approach such mandrel at an angle for winding thereon over such reinforcing element closely adjacent such point of winding of the latter.

17. In apparatus for the manufacture of tubing having a helical reinforcing member and flexible wall material supported thereby, such apparatus including a removable rotatable elongated mandrel, drive means operative to rotate such mandrel selectively in either direction, a carriage mounted for reciprocation adjacent and parallel to such mandrel, and drive means operative thus to reciprocate such carriage; the combination of guide means on such carriage adapted to conduct a continuous reinforcing element from a supply thereof to a point adjacent such mandrel for winding on the latter, and strip wall material supply means mounted on such carriage for shifting to alternative positions respectively to either side of such point of winding, whereby such strip material may be led to such mandrel for winding thereon over such reinforcing element adjacent the point of winding of the latter at an angle from a position in advance of such point, having regard to the direction of reciprocation of such carriage.

18. In apparatus for helically winding two continuous elements upon an elongated mandrel one element upon the other, a support relatively reciprocable longitudinally of such mandrel, two guides on said support spaced transversely of such mandrel through which such respective elements are adapted to be conducted to such mandrel for winding one on the other, one of such elements comprising relatively flat strip material, a supply of such strip material mounted on said support in advance of the point of winding, and means operable in synchronism to reverse the transverse relationship of said guides and shift said supply of strip material to the other side of such point of winding, whereby the relationship of such elements on such mandrel may be maintained when the direction of rotation of such mandrel and the direction of travel of said support are reversed.

19. In apparatus for the manufacture of flexible tubing comprising a helically wound reinforcing element, a wall of flexible strip material, and cord wound on such strip material between the turns of such reinforcing element, such apparatus including a rotatable mandrel and a carriage mounted for reciprocation adjacent and parallel thereto; guide means on such carriage adapted to conduct such reinforcing element to such mandrel for winding thereon, guide means on such carriage adapted to direct such strip material to such mandrel for winding over such reinforcing element closely following the winding of the latter, and guide means adapted to direct such cord to such mandrel for winding over such strip material substantially simultaneously with the winding of the latter, whereby such application of such cord tends to press such strip material toward such mandrel in the region intermediate the turns of such reinforcing element.

20. In apparatus for helically winding two continuous elements upon an elongated mandrel one element upon the other, a support relatively reciprocable longitudinally of such mandrel, and guide means mounted on said support for pivotal movement in a plane parallel to the axis of such mandrel, said guide means having spaced guides for such respective elements disposed on a line generally transverse of such axis whereby by thus pivoting said guide means such elements will be disposed for winding the same element upon the other with such mandrel turning in the opposite direction.

References Cited in the file of this patent

UNITED STATES PATENTS

| | | |
|---|---|---|
| 1,516,620 | Rankin | Nov. 25, 1924 |
| 1,670,061 | Carroll | May 15, 1928 |
| 1,714,541 | Bergstein | May 28, 1929 |
| 1,797,193 | Kimmich | Mar. 17, 1931 |
| 2,176,762 | Forbes | Oct. 17, 1939 |
| 2,321,064 | Broedling | June 8, 1943 |
| 2,366,087 | Chernack | Dec. 26, 1944 |
| 2,367,821 | Davis | Jan. 23, 1945 |
| 2,396,059 | Roberts | Mar. 5, 1946 |
| 2,416,416 | Stolz | Feb. 25, 1947 |
| 2,422,234 | Goldman | June 17, 1947 |
| 2,641,300 | Martin et al. | June 9, 1953 |